(12) United States Patent
Brown

(10) Patent No.: US 11,438,465 B2
(45) Date of Patent: Sep. 6, 2022

(54) AMBIENT LIGHTING INDICATING MACHINE STATUS CONDITIONS

(71) Applicant: Xerox Corporation, Norwalk, CT (US)

(72) Inventor: Donald A. Brown, Honeoye Falls, NY (US)

(73) Assignee: Xerox Corporation, Norwalk, CT (US)

( * ) Notice: Subject to any disclaimer, the term of this patent is extended or adjusted under 35 U.S.C. 154(b) by 486 days.

(21) Appl. No.: 16/229,116

(22) Filed: Dec. 21, 2018

(65) Prior Publication Data
US 2020/0204687 A1 Jun. 25, 2020

(51) Int. Cl.
*H04N 1/00* (2006.01)
*G06F 3/12* (2006.01)

(52) U.S. Cl.
CPC ....... *H04N 1/00129* (2013.01); *G06F 3/1203* (2013.01); *H04N 1/00997* (2013.01)

(58) Field of Classification Search
CPC ............ H04N 1/00129; H04N 1/00997; G06F 3/1203; G06F 3/1259
USPC ................................ 358/1.1–1.18, 474, 471
See application file for complete search history.

(56) References Cited

U.S. PATENT DOCUMENTS

| | | |
|---|---|---|
| 6,658,218 B2 | 12/2003 | Krolczyk et al. |
| 6,741,818 B1 | 5/2004 | Penke et al. |
| 7,245,849 B2 | 7/2007 | Penke et al. |
| 7,782,224 B2 | 8/2010 | Marchetti |
| 9,063,685 B2 | 6/2015 | Oakley et al. |
| 10,048,538 B1* | 8/2018 | Fukuoka ................. G09G 3/36 |
| 10,073,664 B2 | 9/2018 | Skrainar et al. |
| 2004/0239615 A1 | 12/2004 | Firebaugh et al. |
| 2004/0257613 A1* | 12/2004 | Okabe .................. G06F 3/1203 358/1.15 |
| 2005/0212955 A1* | 9/2005 | Craig .................... H04N 5/232 348/362 |
| 2009/0213436 A1 | 8/2009 | Takuwa |
| 2010/0053475 A1* | 3/2010 | Han .................... H04N 9/3141 348/744 |
| 2012/0033243 A1* | 2/2012 | Nakazato ........... G03G 15/0131 358/1.13 |
| 2017/0366689 A1 | 12/2017 | Broughton et al. |

OTHER PUBLICATIONS

DE Application No. 19217236.9, 20180878EP01, European Search Report dated May 13, 2020, pp. 1-8.

* cited by examiner

*Primary Examiner* — Gabriel I Garcia
(74) *Attorney, Agent, or Firm* — Gibb IP Law Firm, LLC

(57) ABSTRACT

A display device is connected to the exterior of a document processing device. The display device includes a screen positioned to display in a first direction away from the exterior. Lights are connected to the display device. The lights are positioned to emit light in second direction toward the exterior of the document processing device. A processor is operatively connected to the display device and the lights. The processor is adapted to control the lights to emit corresponding lighting of a graphic item appearing on the screen.

20 Claims, 7 Drawing Sheets

AMBIENT LIGHTING INDICATING MACHINE STATUS CONDITIONS

BACKGROUND

Systems and methods herein generally relate to document processing devices and more particularly to document processing devices that produce ambient lighting indicating machine status conditions.

Ever-present distractions are an unfortunate persistent detractor from office productivity that modern office equipment often does not accommodate well. Employees regularly begin tasks that are delayed, or sometimes abandoned (sometimes unintentionally) because of the constant distractions that other office demands (including electronic messaging, phone calls, etc.) interject throughout the otherwise productive working day.

For example, many times employees start a document processing job such as a scanning job, copying job, printing job, etc., without ever utilizing the output that is generated by the document processing device because the output either is abandoned or is retrieved after its usefulness has expired. This often results from the undesirable delay and distraction that interruptions add to the office lifestyle.

While some document processing machines include relatively large user interface screens and other displays that inform users when output from the document processing device is ready for use, employees are often drawn away from the immediate vicinity of the user interface screen by other responsibilities. If the workers do not return in a timely manner, the document processing device's output may be abandoned or become useless because of the time delay before retrievable.

SUMMARY

Apparatuses herein include a document processing device that has a body shell (an exterior) and the bottom of the document processing device is the part of the exterior that is adjacent the surface upon which the document processing device rests. Also, a display device is connected to the front of the exterior of the document processing device (where the back of the document processing device is opposite the front). The display device includes a screen positioned to display in a first direction that is away from the exterior of the document processing device.

Additionally, display lights are connected to the surface of the display device that is opposite the screen (the back of the display device) which faces the exterior of the document processing device. Thus, the display lights are positioned to emit light in a second direction that is toward the exterior of the document processing device.

Also, bottom lights are connected to the bottom of the document processing device, and back lights are connected to the back of the document processing device. The bottom lights are positioned to emit light in a third direction toward the surface upon which the document processing device rests, and the back lights are positioned to emit light in fourth direction toward the surface adjacent the back of the document processing device. The display lights, bottom lights, and back lights comprise multi-color display lights, such as light emitting diodes (LEDs).

Additionally, a processor is operatively connected to the display device and the display lights, bottom lights, and back lights. The processor is adapted to control the display lights, bottom lights, and back lights to emit corresponding lighting of a graphic item appearing on the screen. The corresponding lighting appears on the exterior of the document processing device, the surface upon which the document processing device rests, and the surface adjacent the back of the document processing device. The processor is adapted to control the display lights, bottom lights, and back lights such that the graphic item and the corresponding lighting are the same color, such that the graphic item and the corresponding lighting change colors in coordination.

The graphic item changes at a first pattern of change and the corresponding lighting changes at the same first pattern of change in coordination with changing of the graphic item. The different colors and patterns of the graphic item and the corresponding lighting indicate different status conditions of the document processing device including error conditions, warning conditions, active processing conditions, and processing complete conditions.

Methods herein use the processor to determine the status of the graphic item appearing on the screen of the display device. In these methods the processor controls the display lights, bottom lights, and back lights to emit corresponding lighting of the graphic item in the second direction toward (on) the exterior of the document processing device, the surface upon which the document processing device rests, and the surface adjacent the back of the document processing device.

Further, the processor controls the display lights, bottom lights, and back lights such that the graphic item and the corresponding lighting are the same color, such that the graphic item and the corresponding lighting change colors in coordination, and such that the corresponding lighting changes at the same pattern in coordination with changing of the graphic item. Thus, the processor controls the display lights, bottom lights, and back lights to emit different colors and patterns of the graphic item and the corresponding lighting to indicate different status conditions of the document processing device including error conditions, warning conditions, active processing conditions, and processing complete conditions.

These and other features are described in, or are apparent from, the following detailed description.

BRIEF DESCRIPTION OF THE DRAWINGS

Various exemplary systems and methods are described in detail below, with reference to the attached drawing figures, in which.

DETAILED DESCRIPTION

Figure 1A:
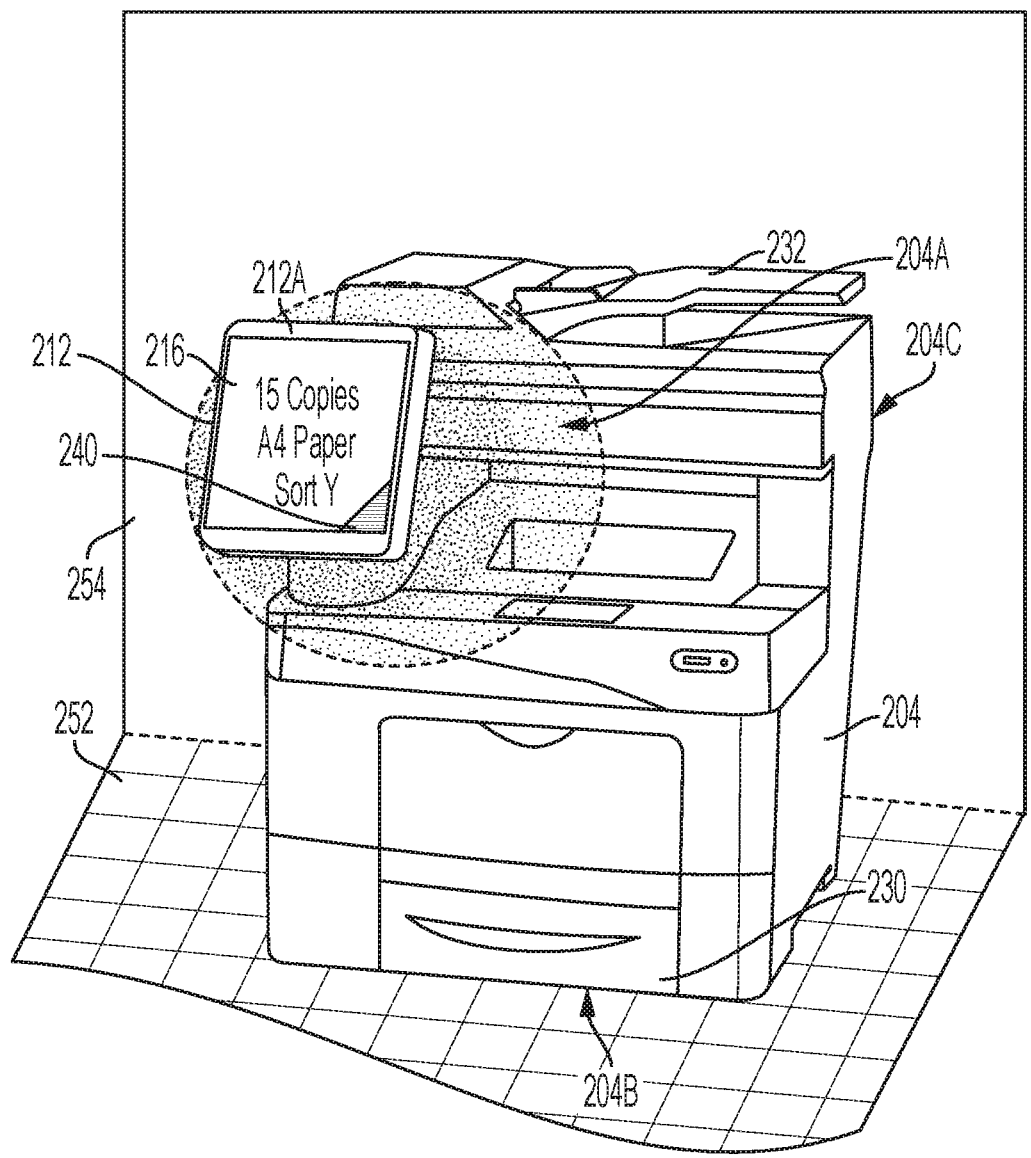
FIGS. 1A-D are perspective schematic diagrams illustrating devices herein.

As mentioned above, while some document processing machines include relatively large user interface screens and other displays that inform users when output from the document processing device is ready for use, employees are often drawn away from the immediate vicinity of the user interface screen by other responsibilities. Therefore, even if the user interface screens are large and easily readable, if workers do not return to a location where they can view the screens in the timely manner, the document processing device's output may be abandoned or become useless because of the time delay to output retrieval.

The methods and processing devices herein address such issues by producing ambient lighting on the front of the machine, on the floor, on walls, etc., that indicates machine status conditions, and this allows users to be aware that output is ready, even if the employee cannot see the user interface screen directly. Further, such ambient lighting can inform employees of various machine conditions that might need attention even when the employee is not directly in front of the machine and cannot view the user interface screen directly.

For example, if a user begins a document processing operation (scanning, copying, printing, etc.) either from the user interface screen of the document processing device itself or remotely, they may not remember that the process was started (because of modern life's distractions or other work responsibilities). This may result in the document processing machine's output being abandoned (never retrieved) or being retrieved only after it has lost its usefulness. However, because the ambient lighting provided by the methods and apparatuses herein, is projected on the front of the document processing device, the floors surrounding the document processing device, a wall behind the document processing device, etc., the user can be reminded of the machine operation they started (even if they are physically too far away from the document processing machine to be able to read the user interface). Thus, the ambient lighting herein increases the likelihood that the user will retrieve the output, which decreases abandonment/nonuse of the machines output, and reduces waste.

Further, machine needs (paper jams, low supplies, component replacement needs, internal failures, etc.) are often displayed on the user interface screen of the document processing devices. However, casual users can ignore such messages (either because machine maintenance is not their responsibility, or because of general ambivalence). Therefore, if the individual responsible for machine maintenance is not notified of the maintenance needs, this may result in the machine need not being addressed and eventually untimely machine downtime, which can again detrimentally affect office productivity. Again, the ambient lighting the methods and apparatuses provide on the machine front, floor, walls, etc., increases the likelihood that the one responsible for machine maintenance will be made aware of the machines need. This reduces the likelihood of unexpected and untimely machine downtime, increasing office productivity.

In greater detail, as shown in conceptual perspective view in FIG. 1A, apparatuses herein can be any form of document processing device 204 that has a body shell (an exterior) various parts of which are labeled in FIG. 1A, using identification numbers 204A-204C. Specifically, identification number 204A identifies the front of the exterior, 204B identifies the bottom of the exterior, and 204C identifies the back of the exterior. Thus, the back 204C of the document processing device 204 is opposite the front 204A. In FIG. 1A, the floor (the surface 252 upon which the document processing device 204 rests) is below the dashed line, and an exemplary wall 254 that could be behind the back 204C of the document processing device 204 is above the dashed line. Those ordinarily skilled in the art would understand that the document processing device 204 could be positioned in other locations, resulting in items other than the floor 252 and wall 254 being illuminated by the ambient lighting discussed herein.

As also shown in FIG. 1A, a display device 212 is connected to the front 204A of the exterior of the document processing device 204. The display device 212 includes a screen 216 positioned on the front of the display device 212 in a position to display job information (#Copies, Paper Type, etc.) in a first direction (front direction) that is away from the front 204A of the document processing device 204. In other words, the screen 216 (and the machine front 204A) is viewable by user when standing facing the front 204A of the document processing device 204.

Figure 2:
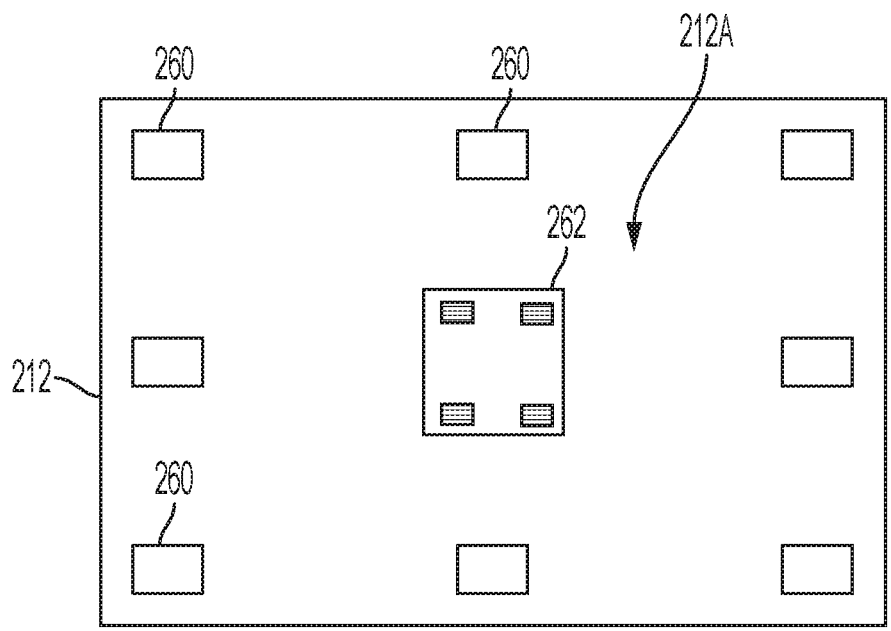
FIGS. 2-4 are plan schematic diagrams illustrating devices herein.

In FIG. 1A, the back 212A of the display device 212 is opposite the screen 216 and faces the front 204A of the document processing device 204. Referring briefly to FIG. 2, that drawing illustrates the back 212A of the display device 212 and shows that the back 212A of the display device 212 includes display lights 260 that are connected to, or an integral with, the back surface 212A of the display device 212. As shown in FIG. 2, the back 212A of the display device 212 can also include a mount structure 262 that can be used to connect the display device 212 to the exterior of the document processing device 204. Thus, referring again to FIG. 1A, the display lights 260 are positioned to emit light in second direction that is toward the front 204A of the document processing device 204. In FIG. 1A, the emitted light is shown using partially transparent markings over the front 204A of the document processing device 204 within a dashed circle.

Figure 3:
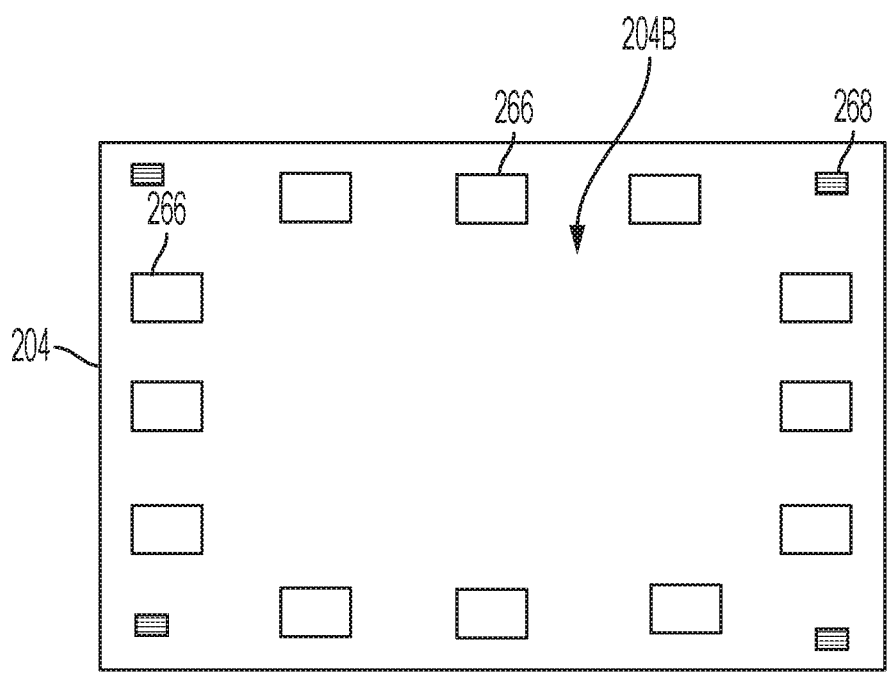

Referring to FIG. 1B, again the bottom 204B of the document processing device 204 is the part of the exterior that is adjacent the surface 252 upon which the document processing device 204 rests. Referring briefly to FIG. 3, that drawing illustrates the bottom 204B of the document processing device 204. As shown in FIG. 3, the bottom 204B includes wheels 268 or other similar structures that support the document processing device 204 on the floor surface 252 (FIG. 1).

FIG. 3 also illustrates that bottom lights 266 are connected to, or integral with, the bottom 204B of the document processing device 204. Referring again to FIG. 1B, the bottom lights 266 are positioned to emit light in a third direction toward the surface 252 upon which the document processing device 204 rests (e.g., toward the floor). Similarly, in FIG. 1B, the emitted light is shown using partially transparent markings on the floor surface 252 within a dashed circle.

Figure 1B:
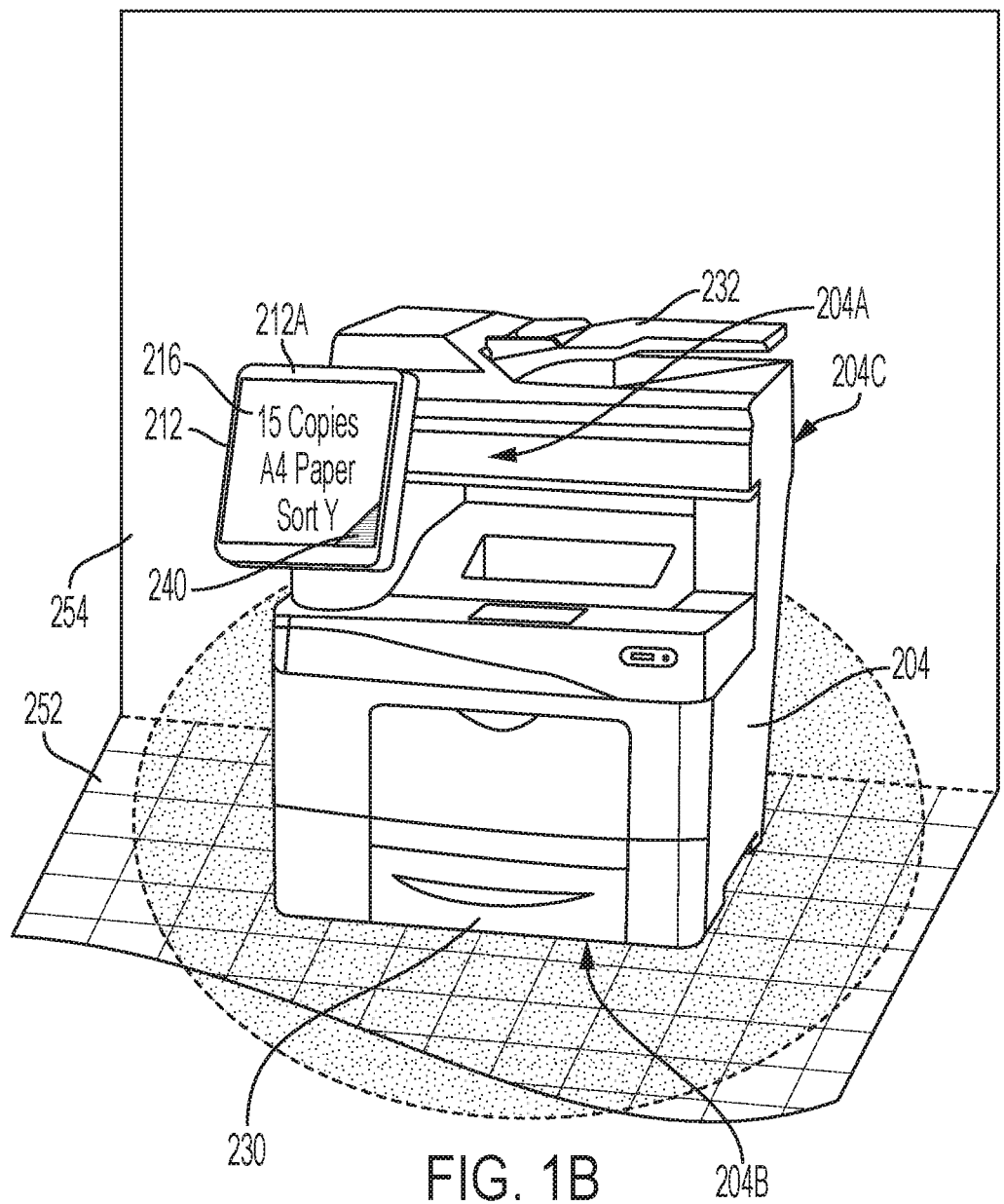
Figure 1C:
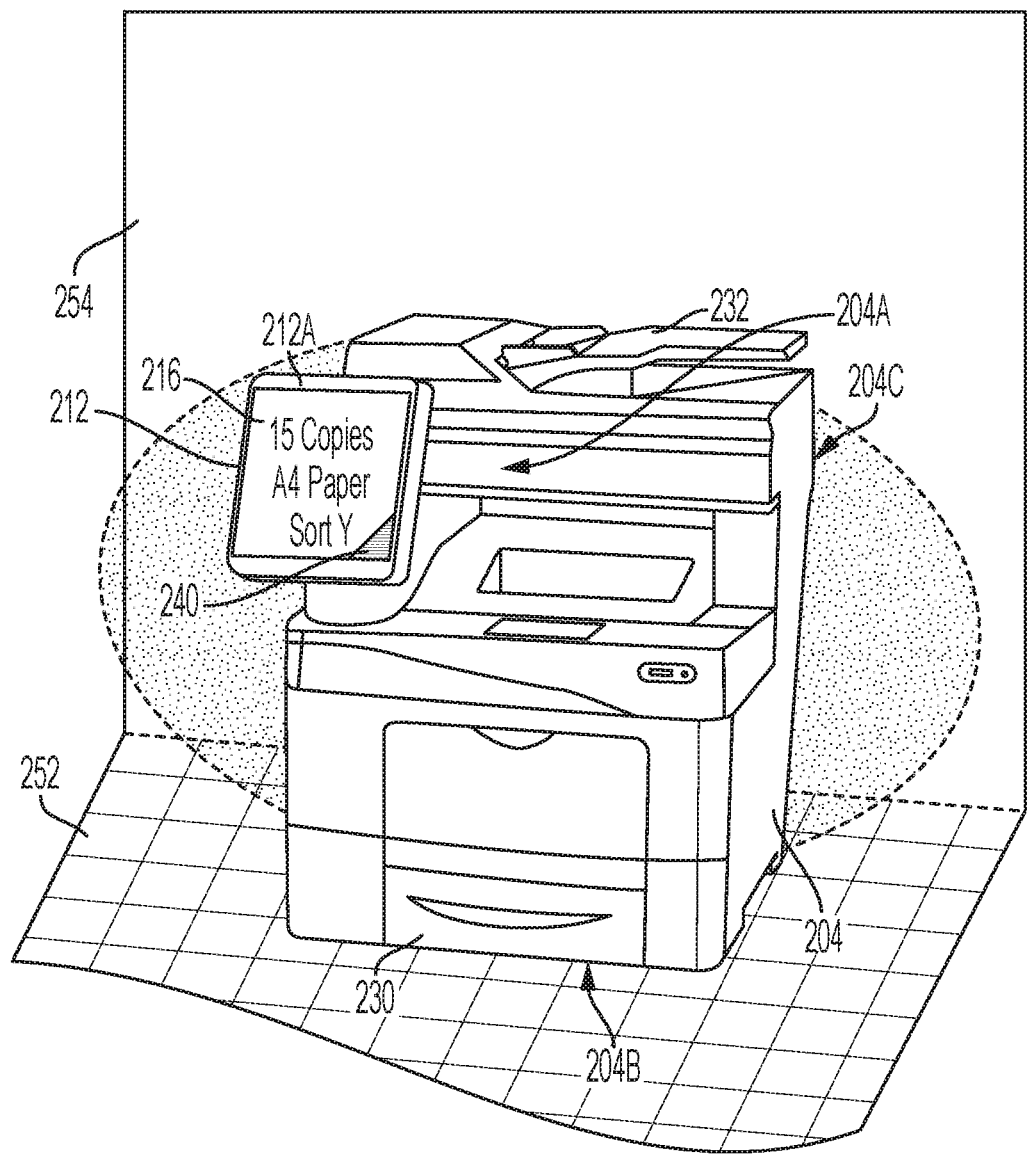
Figure 1D:
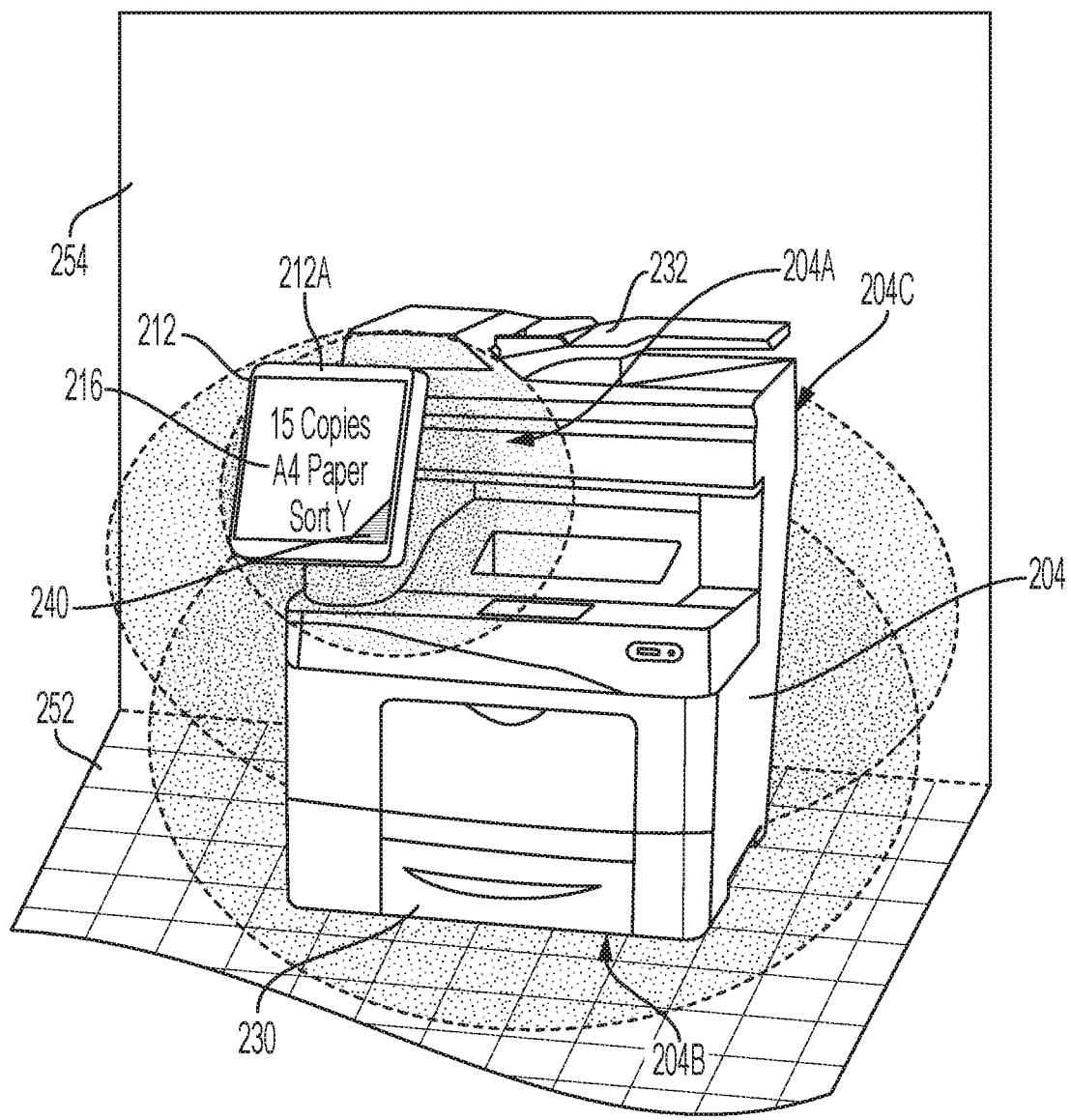
Figure 4:
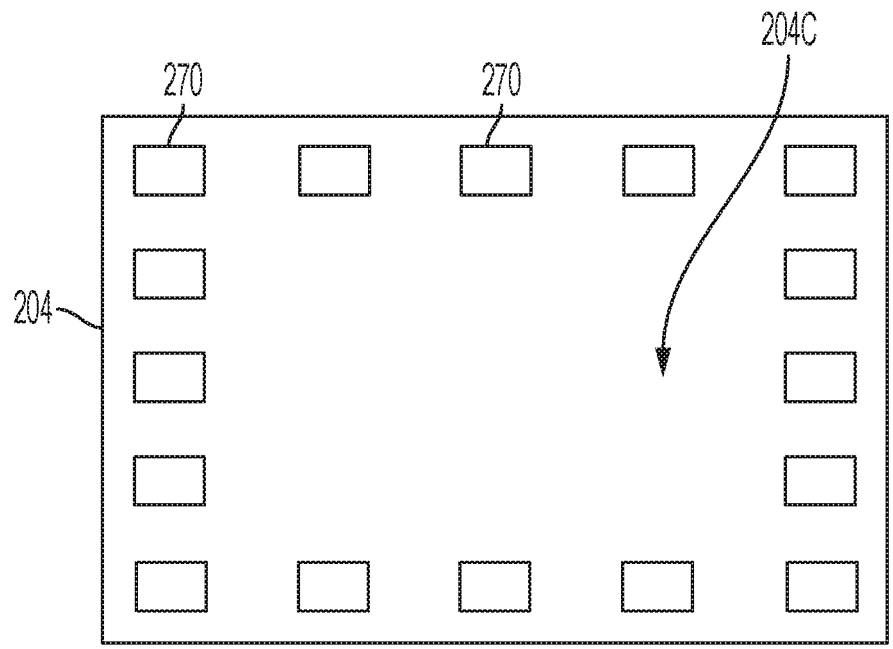

Referring to FIG. 1C, again the back 204C of the document processing device 204 is the part of the exterior that is adjacent a wall 254 in the use example shown in FIGS. 1A-1D. Referring briefly to FIG. 4, that drawing illustrates the back 204C of the document processing device 204. As shown in FIG. 4, the back 204C includes back lights 270 that are connected to, or integral with, the back 204C and are positioned to emit light in fourth direction toward any surface adjacent the back 204C of the document processing device 204 (e.g., the wall 254 in this example).

The aforementioned display lights 260, bottom lights 266, and back lights 270 can be multi-color display lights 260, such as multi-color light emitting diodes (LEDs). Also, while each of FIGS. 1A-1C show only one of the sets of lights emitting light at a time, in various embodiments herein some or all of such lights can simultaneously emit light, as shown in FIG. 1D.

Additionally, a processor 224 is included within the document processing device (e.g., see FIG. 6, discussed below). Such a processor 224 is operatively connected to the display device 212 and the display lights 260, bottom lights 266, and back lights 270. The processor 224 is adapted to control the display lights 260, bottom lights 266, and back lights 270 to emit corresponding lighting of the graphic item 240 appearing on the screen 216. This causes the corresponding lighting to appear on the front of the document processing device 204A, the surface 252 upon which the document processing device 204 rests, and the surface (e.g., wall 254) adjacent the back 204C of the document processing device 204.

The processor 224 is adapted to control the display lights 260, bottom lights 266, and back lights 270 such that the graphic item 240 and the corresponding lighting are the same color and change colors in coordination, etc. For example, the graphic item 240 may change color, brightness, etc., at a first pattern of change and the corresponding lighting is controlled by the processor 224 to identically change at the same first pattern of change in coordination with the changing of the graphic item 240.

The different colors and patterns of the graphic item 240 and the corresponding lighting indicate different status conditions of the document processing device 204 including error conditions, warning conditions, active processing conditions, and processing complete conditions.

Thus, in one non-limiting example, the graphic item 240 and the ambient lighting from one or more of the display lights 260, bottom lights 266, and back lights 270 ("ambient lighting") can be a specific color (e.g., yellow, etc.) when the device is ready to begin/receive instructions or a document processing operation ("job") is being input directly to the screen 216 or remotely. The graphic item 240 and the ambient lighting 260, 266, 270 can then change to a different color (e.g., blue, etc.) while the job is being processed, and can change to yet another color (e.g., green, etc.) when the job is complete, and the output is ready. Because these colors are broadcast on the machine front 204A, the floor 252, and/or the wall 254, the user is continuously made aware of the status of their job even if they are not in a position where they can view the screen 216.

In other examples, if a maintenance condition exists or occurs during a job, other warning or alert colors (e.g., orange, red, etc.) can be provided on the graphic item 240 and through the ambient lighting 260, 266, 270 to inform the user or the one responsible for machine maintenance that a machine issue needs to be addressed.

Further, the lighting pattern of the graphic item 240 and the ambient lighting 260, 266, 270 can change depending upon the severity of the condition. In one example, if a maintenance item that is not critical occurs, the light intensity can be relatively low or can be made to blink or pulse slowly, etc. However, if the maintenance item is severe (causes a machine shutdown) the light intensity can be relatively high, the light can blink or pulse quickly, alternating colors can be displayed rapidly, etc.

Similarly, if the output of a job is not retrieved by the expiration a first time period, the lighting that indicates machine output is ready (e.g., green in the foregoing example) can be made to blink or pulse. Further, as additional time periods expire, the light intensity or rate at which the light blinks or pulses can increase. Additionally, as more time periods expire and the job is still not retrieved, the light can change to a different color to further indicate that an overdue output is ready.

Figure 5:
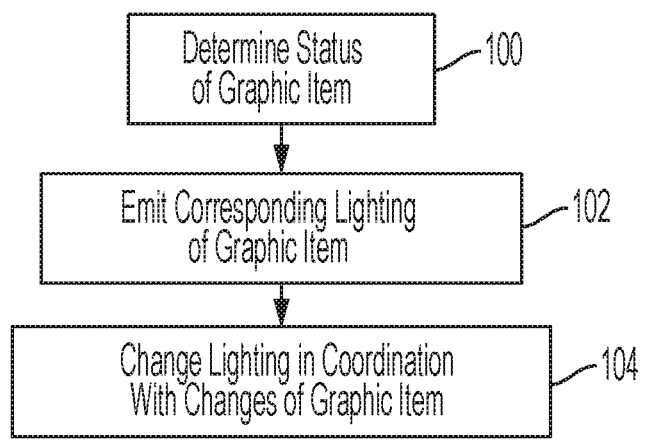
FIG. 5 is a flow diagram of various methods herein.

FIG. 5 is flowchart illustrating exemplary methods herein. In item 100, these methods use the processor to determine the status of the graphic item appearing on the screen of the display device. In item 102, the processor is used to control the display lights, bottom lights, and back lights to emit corresponding lighting of the graphic item in the second direction toward (on) the exterior of the document processing device, the surface upon which the document processing device rests, and the surface adjacent the back of the document processing device.

Further, in item 104, in these methods the processor controls the display lights, bottom lights, and back lights such that the graphic item and the corresponding lighting are the same color, such that the graphic item and the corresponding lighting change colors in coordination, and such that the corresponding lighting changes at the same pattern in coordination with changing of the graphic item. Thus, in item 104, the processor controls the display lights, bottom lights, and back lights to emit different colors and patterns of the graphic item and the corresponding lighting to indicate different status conditions of the document processing device including error conditions, warning conditions, active processing conditions, and processing complete conditions.

Figure 6:
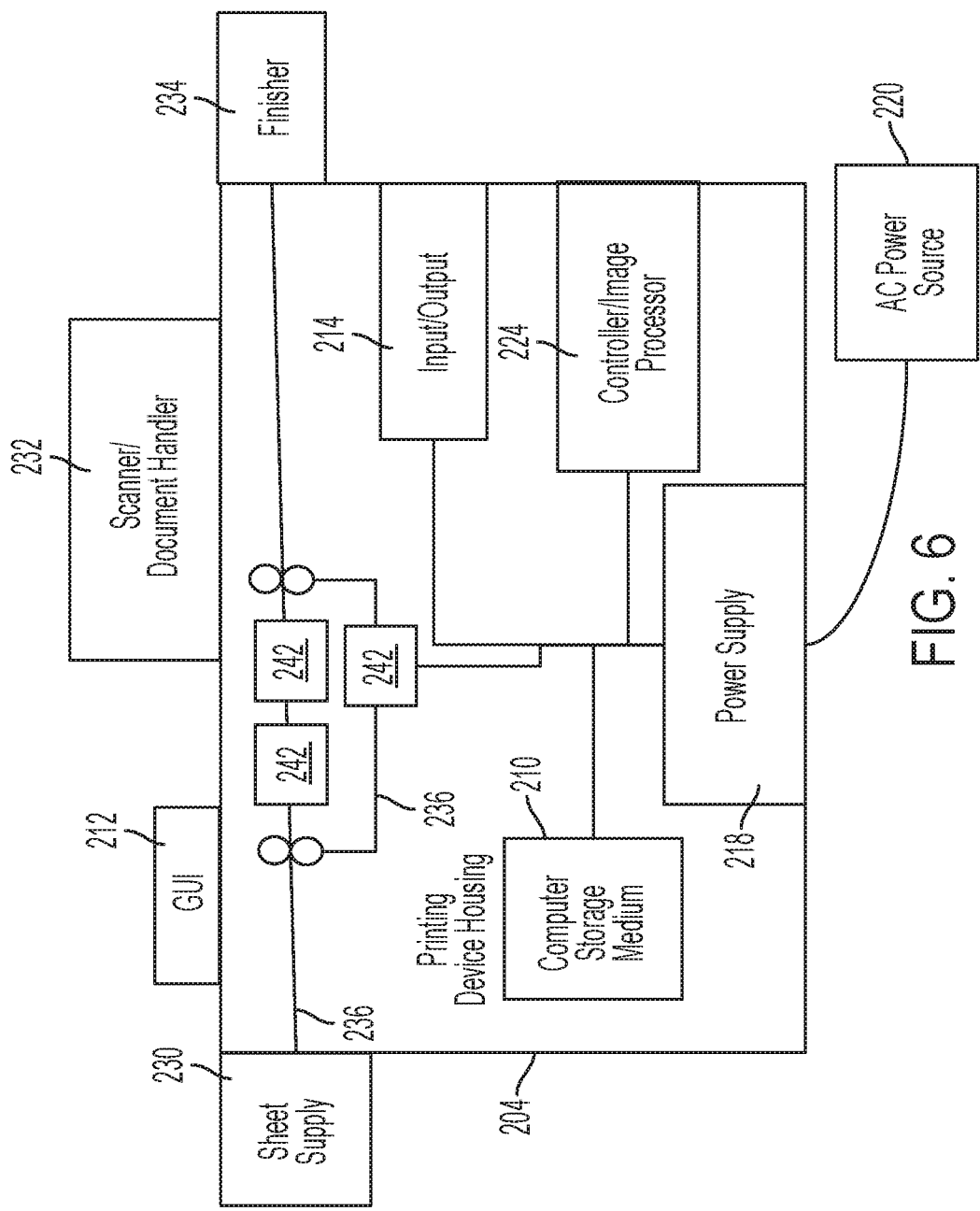
FIG. 6 is a schematic diagram illustrating devices herein.

FIG. 6 illustrates many components of printer structures 204 herein that can comprise, for example, a printer, copier, multi-function machine, multi-function device (MFD), etc. The printing device 204 includes a controller/tangible processor 224 and a communications port (input/output) 214 operatively connected to the tangible processor 224 and to a computerized network external to the printing device 204. Also, the printing device 204 can include at least one accessory functional component, such as a graphical user interface (GUI) assembly 212. The user may receive messages, instructions, and menu options from, and enter instructions through, the graphical user interface or control panel 212.

The input/output device 214 is used for communications to and from the printing device 204 and comprises a wired device or wireless device (of any form, whether currently known or developed in the future). The tangible processor 224 controls the various actions of the printing device 204. A non-transitory, tangible, computer storage medium device 210 (which can be optical, magnetic, capacitor based, etc., and is different from a transitory signal) is readable by the tangible processor 224 and stores instructions that the tangible processor 224 executes to allow the computerized device to perform its various functions, such as those described herein. Thus, as shown in FIG. 6, a body housing has one or more functional components that operate on power supplied from an alternating current (AC) source 220 by the power supply 218. The power supply 218 can comprise a common power conversion unit, power storage element (e.g., a battery, etc.), etc.

The printing device 204 includes at least one marking device (printing engine(s)) 242 that use marking material, and are operatively connected to a specialized image processor 224 (that is different from a general purpose computer because it is specialized for processing image data), a media path 236 positioned to supply continuous media or sheets of media from a sheet supply 230 to the marking device(s) 242, etc. After receiving various markings from the printing engine(s) 242, the sheets of media can optionally pass to a finisher 234 which can fold, staple, sort, etc., the various printed sheets. Also, the printing device 204 can include at least one accessory functional component (such as a scanner/document handler 232 (automatic document feeder (ADF)), etc.) that also operate on the power supplied from the external power source 220 (through the power supply 218).

The one or more printing engines 242 are intended to illustrate any marking device that applies marking material (toner, inks, plastics, organic material, etc.) to continuous media, sheets of media, fixed platforms, etc., in two- or three-dimensional printing processes, whether currently known or developed in the future. The printing engines 242 can include, for example, devices that use electrostatic toner printers, inkjet printheads, contact printheads, three-dimensional printers, etc. The one or more printing engines 242 can include, for example, devices that use a photoreceptor belt or an intermediate transfer belt or devices that print directly to print media (e.g., inkjet printers, ribbon-based contact printers, etc.).

As noted above, the processor 224 is adapted to automatically determine the status of the graphic item 240 appearing on the screen 216 of the display device 204. The processor 224 is also adapted to automatically control the display lights, bottom lights, and back lights 260, 266, 270 to emit corresponding lighting of the graphic item 240 in the second direction toward (on) the front 204A of the document processing device 204, the surface 252 upon which the document processing device 204 rests, and the surface 254 adjacent the back of the document processing device 204.

Further, the processor 224 is adapted to automatically control the display lights, bottom lights, and back lights 260, 266, 270 such that the graphic item 240 and the corresponding lighting are the same color, such that the graphic item 240 and the corresponding lighting 260, 266, 270 change colors in coordination, and such that the corresponding lighting changes at the same pattern in coordination with changing of the graphic item 240. Thus, the processor 224 is adapted to automatically control the display lights, bottom lights, and back lights 260, 266, 270 to emit different colors and patterns of the graphic item 240 and the corresponding lighting to indicate different status conditions of the document processing device 204 including error conditions, warning conditions, active processing conditions, and processing complete conditions.

While some exemplary structures are illustrated in the attached drawings, those ordinarily skilled in the art would understand that the drawings are simplified schematic illustrations and that the claims presented below encompass many more features that are not illustrated (or potentially many less) but that are commonly utilized with such devices and systems. Therefore, Applicants do not intend for the claims presented below to be limited by the attached drawings, but instead the attached drawings are merely provided to illustrate a few ways in which the claimed features can be implemented.

Many computerized devices are discussed above. Computerized devices that include chip-based central processing units (CPU's), input/output devices (including graphic user interfaces (GUI), memories, comparators, tangible processors, etc.) are well-known and readily available devices produced by manufacturers such as Dell Computers, Round Rock Tex., USA and Apple Computer Co., Cupertino Calif., USA. Such computerized devices commonly include input/output devices, power supplies, tangible processors, electronic storage memories, wiring, etc., the details of which are omitted herefrom to allow the reader to focus on the salient aspects of the systems and methods described herein. Similarly, printers, copiers, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known and are not described in detail herein to keep this disclosure focused on the salient features presented. The systems and methods herein can encompass systems and methods that print in color, monochrome, or handle color or monochrome image data. All foregoing systems and methods are specifically applicable to electrostatographic and/or xerographic machines and/or processes.

In addition, terms such as "right", "left", "vertical", "horizontal", "top", "bottom", "upper", "lower", "under", "below", "underlying", "over", "overlying", "parallel", "perpendicular", etc., used herein are understood to be relative locations as they are oriented and illustrated in the drawings (unless otherwise indicated). Terms such as "touching", "on", "in direct contact", "abutting", "directly adjacent to", etc., mean that at least one element physically contacts another element (without other elements separating the described elements). Further, the terms automated or automatically mean that once a process is started (by a machine or a user), one or more machines perform the process without further input from any user. Additionally, terms such as "adapted to" mean that a device is specifically designed to have specialized internal or external components that automatically perform a specific operation or function at a specific point in the processing described herein, where such specialized components are physically shaped and positioned to perform the specified operation/function at the processing point indicated herein (potentially without any operator input or action). In the drawings herein, the same identification numeral identifies the same or similar item.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the systems and methods herein cannot be implied or imported from any above example as limitations to any particular order, number, position, size, shape, angle, color, or material.

What is claimed is:

1. An apparatus comprising:
   a document processing device having an exterior;
   a display device connected to the exterior, wherein the display device includes a screen positioned to display in a first direction away from the exterior;
   lights connected to the display device, wherein the lights are connected to a surface of the display device that is opposite the screen, and wherein the lights are positioned to emit light in second direction toward the exterior; and
   a processor operatively connected to the display device and the lights,
   wherein the processor is adapted to control the lights to emit corresponding lighting of a graphic item appearing on the screen.

2. The apparatus according to claim 1, wherein the corresponding lighting appears on the exterior.

3. The apparatus according to claim 1, wherein the processor is adapted to control the lights such that the graphic item and the corresponding lighting are the same color.

4. The apparatus according to claim 3, wherein the processor is adapted to control the lights such that the graphic item and the corresponding lighting change colors in coordination.

5. The apparatus according to claim 1, wherein the graphic item changes at a first pattern of change and the corresponding lighting changes at the first pattern of change in coordination with changing of the graphic item.

6. The apparatus according to claim 1, wherein the lights comprise multi-color lights.

7. The apparatus according to claim 1, wherein different colors and patterns of the graphic item and the corresponding lighting indicate different status conditions of the document processing device including error conditions, warning conditions, active processing conditions, and processing complete conditions.

8. An apparatus comprising:
a document processing device having an exterior and a bottom of the exterior adjacent a surface upon which the document processing device rests;
a display device connected to the exterior, wherein the display device includes a screen positioned to display in a first direction away from the exterior;
display lights connected to the display device, wherein the display lights are connected to a surface of the display device that is opposite the screen, and wherein the display lights are positioned to emit light in second direction toward the exterior;
bottom lights connected to the bottom of the exterior, wherein the bottom lights are positioned to emit light in a third direction toward the surface upon which the document processing device rests; and
a processor operatively connected to the display device and the display lights,
wherein the processor is adapted to control the display lights and the bottom lights to emit corresponding lighting of a graphic item appearing on the screen.

9. The apparatus according to claim 8, wherein the corresponding lighting appears on the exterior and the surface upon which the document processing device rests.

10. The apparatus according to claim 8, wherein the processor is adapted to control the display lights and the bottom lights such that the graphic item and the corresponding lighting are the same color.

11. The apparatus according to claim 10, wherein the processor is adapted to control the display lights and the bottom lights such that the graphic item and the corresponding lighting change colors in coordination.

12. The apparatus according to claim 8, wherein the graphic item changes at a first pattern of change and the corresponding lighting changes at the first pattern of change in coordination with changing of the graphic item.

13. The apparatus according to claim 8, wherein the display lights and the bottom lights comprise multi-color display lights.

14. The apparatus according to claim 8, wherein different colors and patterns of the graphic item and the corresponding lighting indicate different status conditions of the document processing device including error conditions, warning conditions, active processing conditions, and processing complete conditions.

15. A method comprising:
determining, by a processor operatively connected to a display device, a status of a graphic item appearing on a screen of the display device, wherein the screen is positioned to display in a first direction away from an exterior of a document processing device connected to the display device; and
controlling, by the processor, display lights that are connected to a surface of the display device that is opposite the screen to emit corresponding lighting of the graphic item in a second direction toward the exterior of the document processing device, wherein the display lights are connected to the display device.

16. The method according to claim 15, wherein the display lights are controlled to emit the corresponding lighting on the exterior.

17. The method according to claim 15, wherein the display lights are controlled such that the graphic item and the corresponding lighting are the same color.

18. The method according to claim 17, wherein the display lights are controlled such that the graphic item and the corresponding lighting change colors in coordination.

19. The method according to claim 15, wherein the graphic item changes at a first pattern of change and wherein the display lights are controlled such that the corresponding lighting changes at the first pattern of change in coordination with changing of the graphic item.

20. The method according to claim 15, wherein different colors and patterns of the graphic item and the corresponding lighting indicate different status conditions of the document processing device including error conditions, warning conditions, active processing conditions, and processing complete conditions.

* * * * *